(12) United States Patent
Nehme et al.

(10) Patent No.: US 12,726,086 B2
(45) Date of Patent: Sep. 1, 2026

(54) AIRCRAFT ELECTRIC PROPULSION SYSTEM

(71) Applicant: SAFRAN ELECTRICAL & POWER, Blagnac (FR)

(72) Inventors: Samir Nehme, Moissy-Cramayel (FR); Vincent Chaperon, Moissy-Cramayel (FR); Sonia Dhokkar, Moissy-Cramayel (FR); Raïs M'Fumu Ambil, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 279 days.

(21) Appl. No.: 18/292,434

(22) PCT Filed: Jul. 15, 2022

(86) PCT No.: PCT/FR2022/051419
§ 371 (c)(1),
(2) Date: Jan. 26, 2024

(87) PCT Pub. No.: WO2023/007074
PCT Pub. Date: Feb. 2, 2023

(65) Prior Publication Data

US 2024/0250585 A1 Jul. 25, 2024

(30) Foreign Application Priority Data

Jul. 26, 2021 (FR) ....................................... 2108099

(51) Int. Cl.
*H02K 11/33* (2016.01)
*B64C 29/00* (2006.01)
(Continued)

(52) U.S. Cl.
CPC ............. *H02K 11/33* (2016.01); *B64D 27/30* (2024.01); *H02K 9/19* (2013.01); *H02K 21/16* (2013.01); *B64C 29/00* (2013.01); *H02K 2213/06* (2013.01)

(58) Field of Classification Search
CPC ........ B64C 29/00; B64D 27/30; H02K 11/33; H02K 21/16; H02K 2213/06; H02K 9/19
(Continued)

(56) References Cited

U.S. PATENT DOCUMENTS 8,354,768 B2 * 1/2013 Cipriani ................. H02K 21/24 310/216.099
8,536,751 B2 * 9/2013 Cipriani ................. H02K 21/24 310/68 B
(Continued)

FOREIGN PATENT DOCUMENTS

DE 112011102869 T5 6/2013
JP 2007116840 A 1/2016
(Continued)

OTHER PUBLICATIONS

Search Report and Written Opinion issued in International Application No. PCT/FR2022/051419, mailed Oct. 17, 2022.
(Continued)

*Primary Examiner* — Alex W Mok
(74) *Attorney, Agent, or Firm* — Bookoff McAndrews, PLLC

(57) ABSTRACT

Aircraft electric propulsion system including:
a motor including a hollow rotor, and
a power and control electronics device,
in which the power and control electronics device includes at least two ring-shaped electrical tracks each including at least two inverters, the inverters being connected to each other in parallel, wherein that the
(Continued)

electrical tracks delimit a hollow circular part of the power and control electronics device, the hollow circular part being placed in the axis of the hollow rotor of the motor.

9 Claims, 3 Drawing Sheets

(51) Int. Cl.
*B64D 27/30* (2024.01)
*H02K 9/19* (2006.01)
*H02K 21/16* (2006.01)

(58) Field of Classification Search
USPC ........................................................ 310/68 D
See application file for complete search history.

(56) References Cited

U.S. PATENT DOCUMENTS 10,008,910 B2 * 6/2018 Jahshan .................... H02P 9/02
10,131,441 B2 * 11/2018 Edwards ................ B64D 27/31
2017/0197730 A1 * 7/2017 Lutze ..................... B64D 27/33
2018/0118356 A1 * 5/2018 Armstrong ................ H02J 4/00
2018/0145603 A1 * 5/2018 Kim ................... H05K 7/20845
2018/0331603 A1 * 11/2018 Jahshan ................... H02K 1/27
2020/0385139 A1 12/2020 Verna et al.

FOREIGN PATENT DOCUMENTS

WO 2016005101 A1 1/2016
WO 2019145370 A1 8/2019

OTHER PUBLICATIONS

Search Report issued in French Application No. 2108099, mailed on Apr. 8, 2022.

* cited by examiner

[Fig. 1]
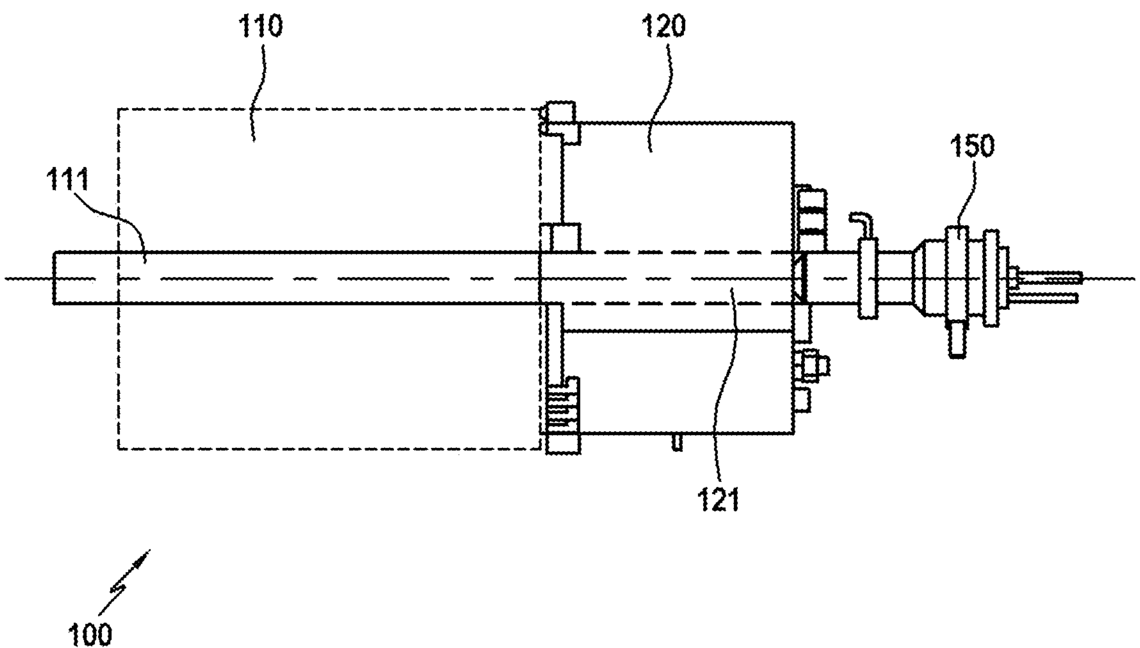
[Fig. 2A]
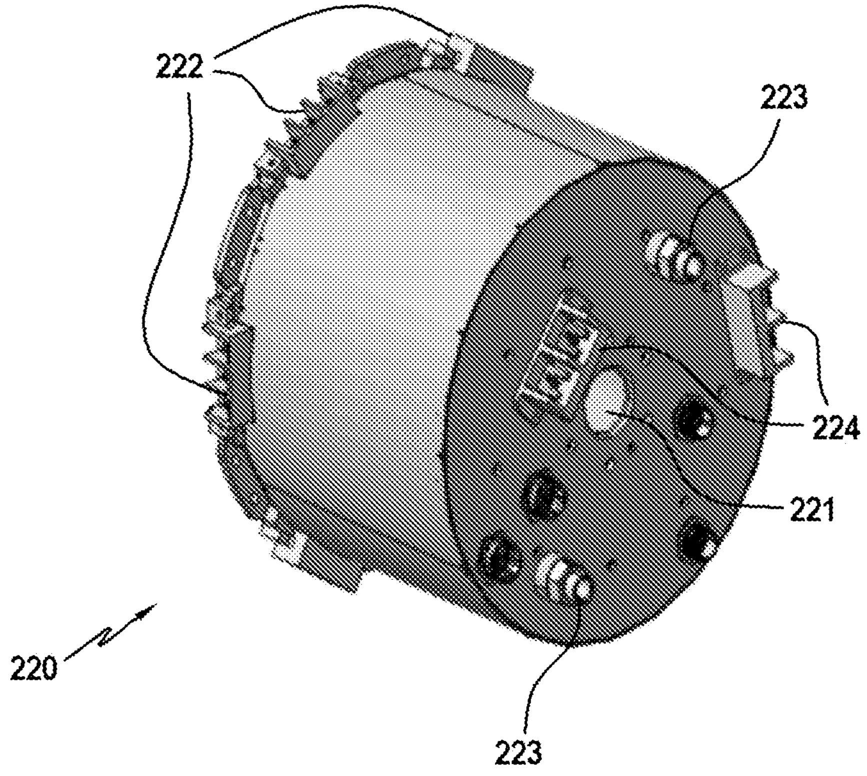

[Fig. 2B]
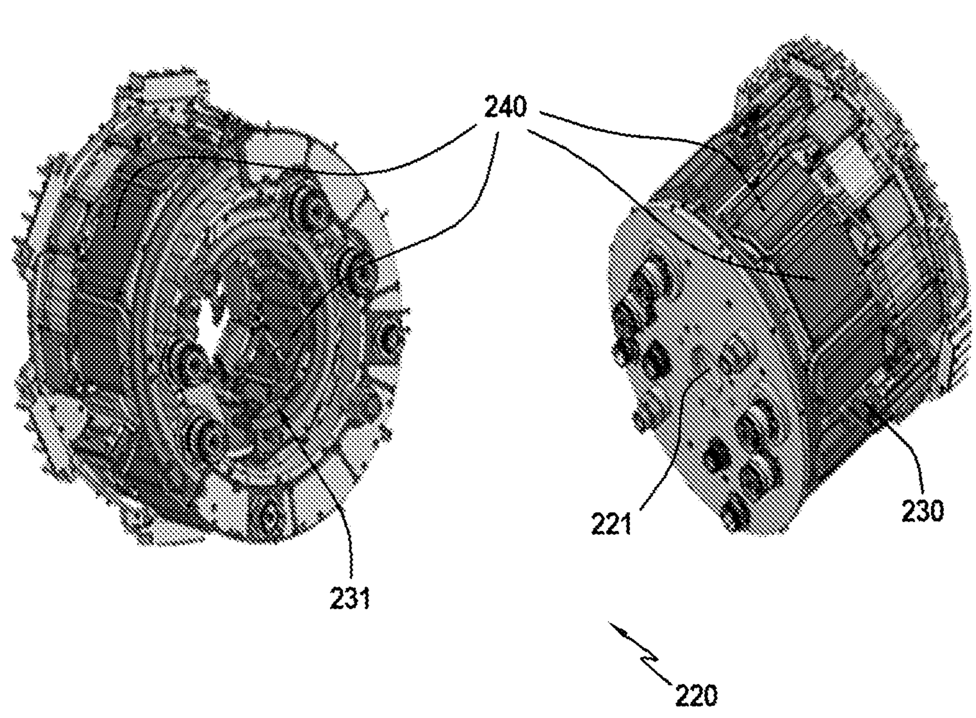

[Fig. 3]

330
340
HVDC+
HVDC-
331
341
342
343
344
Ph A
Ph B
Ph C
345

AIRCRAFT ELECTRIC PROPULSION SYSTEM

CROSS-REFERENCE TO RELATED APPLICATIONS

This is a National Stage Application under 35 U.S.C. § 371 of International Application No. PCT/FR2022/051419, filed Jul. 15, 2022, now published as WO 2023/007074 A1, which claims priority to French Patent Application No. 2108099, filed on Jul. 26, 2021.

TECHNICAL FIELD

The present invention relates to the general field of aircraft electric propulsion systems, and more particularly to the mechatronics integration of a power and control electronics device of an electric propulsion system.

PRIOR ART

The electric or hybrid electric/thermal propulsion of the conventional aircrafts (CTOL), short takeoff and landing aircrafts (STOL) and vertical takeoff and landing aircrafts (VTOL) is achieved by one or several electric motors. The conventional electric motor monitoring architecture is composed of a direct voltage source connected by power harnesses to a power and control electronics device, itself connected by power harnesses to an electric motor, itself connected to a propeller via a rotor or a gearbox. Generally, the power and control electronics device comprises inverters and, for each inverter, power modules, a filter circuit, power module driver boards and interface and monitoring boards. The mechatronics integration of this architecture is often of the parallelepiped type and carried out in bulky cases.

In addition, for high powers (greater than 200 kW), the power and control electronics devices are increasingly heavy and bulky, and the power harnesses used are copper harnesses of large diameter generating thermal losses.

It is therefore desirable to have a new electric motor monitoring architecture that is less bulky and of reduced mass while remaining reliable in increasingly harsh environments on the thermal and vibrational levels.

DISCLOSURE OF THE INVENTION

The invention relates to an aircraft electric propulsion system comprising:

- a motor comprising a hollow rotor, and
- a power and control electronics device, in which the power and control electronics device comprises at least two ring-shaped electrical tracks each comprising at least two inverters, the inverters being connected to each other in parallel, characterized in that the electrical tracks delimit a hollow circular part of the power and control electronics device, the hollow circular part being placed in the axis of the hollow rotor of the motor.

By placing the electrical tracks of the power and control electronics device in rings, a power and control electronics device of hollow circular shape is obtained which allows a propeller pitch driving shaft to pass to the center of the power electronics. Thanks to this circular geometry, the power and control electronics device can be leaned against the motor, and thus the number of power harnesses can be reduced and therefore the mass and size of the propulsion system can be reduced.

Finally, having several tracks within the power and control electronics device makes it possible to improve the availability of the power chain, because the tracks are redundant with each other.

According to one particular characteristic of the invention, the rings formed by the electrical tracks of the power and control electronics device are concentric, one of the rings forming an inner surface of the hollow circular part and another of the rings forming an outer surface of the hollow circular part.

This makes it possible to have a compact power and control electronics device, and to ensure homogeneous cooling of the tracks, in particular when a cooling circuit is common to the motor and to the power and control electronics device.

According to one particular characteristic of the invention, the power and control electronics device has a power comprised between 400 kW and 1 MW, for example 540 kW, in which each electrical track has a power comprised between 200 kW and 500 kW, for example 270 kW, and each inverter has a power greater than or equal to 70 kW, for example 90 kW.

The electrical tracks are thus equivalent and when one is faulty, the others can take over without the fault propagating.

According to another particular characteristic of the invention, the motor is a permanent magnet motor.

According to another particular characteristic of the invention, the system comprises a propeller pitch actuator placed at least partly in the hollow circular part of the power and control electronics device and in the axis of the hollow rotor of the motor.

In this case, the actuator can be leaned against the structure of the power and control electronics device in order to fix it. The actuator can also be monitored by the power and control electronics device or by another external monitoring unit.

According to another particular characteristic of the invention, the system comprises a fluid cooling circuit configured to cool the motor and the power and control electronics device.

According to one embodiment of the invention, the system is a vertical takeoff and landing aircraft propulsion system (VTOL).

According to another embodiment of the invention, the system is a short takeoff and landing aircraft propulsion system (STOL).

According to another embodiment of the invention, the system is a conventional aircraft propulsion system (CTOL).

Another object of the invention is an aircraft with electric or hybrid electric/thermal propulsion comprising a propulsion system according to the invention.

BRIEF DESCRIPTION OF THE DRAWINGS

Other characteristics and advantages of the present invention will emerge from the description given below, with reference to the appended drawings which illustrate exemplary embodiments thereof without any limitation.

FIG. 1 schematically and partially represents an electric propulsion system according to one embodiment of the invention.

FIG. 2A schematically and partially represents an external view of a power and control electronics device according to one embodiment of the invention.

FIG. 2B schematically and partially represents an internal view of a power and control electronics device according to one embodiment of the invention.

FIG. 3 schematically and partially represents an electrical track of the power and control electronics device according to one embodiment of the invention.

DESCRIPTION OF THE EMBODIMENTS

FIG. 1 schematically and partially represents an electric propulsion system 100 according to one embodiment of the invention.

The electric propulsion system 100 comprises a motor 110 comprising a hollow rotor 111 and a power and control electronics device 120.

The power and control electronics device 120 comprises a hollow circular part 121 placed facing the hollow rotor 111 of the motor 110. The power and control electronics device 120 is placed on the rear face of the motor 110, which makes it possible to dispense with a power harness and with an electromagnetic filtering between the motor 110 and the device 120. In addition, it is also possible to optimize the cooling circuit by using a single cooling circuit to cool the motor 110 and the device 120, the cooling circuit being for example a fluid cooling circuit. This also makes it possible to reduce the total mass of the propulsion system 100.

By having the power and control electronics device 120 close to the motor 110, the losses related to the electrical components, in particular to the inverters, of the device 120 are also reduced, which makes it possible to obtain better efficiency. In addition, it is also possible to eliminate the protection means usually used with a power and control electronics device remote from the motor.

Thanks to the hollow rotor 111 and to the hollow circular part 121, it is possible to allow the mechanics of a propeller airfoil pitch actuator 150 to pass to the center of the propulsion system. This allows the propeller monitoring mechanics to pass to the center of the propulsion system 100 and to obtain a compact system.

The motor is for example a permanent magnet motor.

FIGS. 2A and 2B schematically and partially represent a power and control electronics device 220 according to one embodiment of the invention, and more particularly FIG. 2A represents an external view and FIG. 2B an internal view of the device 220.

The power and control electronics device 220 comprises two electrical tracks 230 and 231. The two tracks 230 and 231 are in the form of concentric rings. Thus, the ring formed by the track 231 has the smallest diameter and forms an inner surface of the hollow circular part 221 of the power and control electronics device 220; and the ring formed by the track 230 has the largest diameter and forms an outer surface of the hollow circular part 221.

The two tracks 230 and 231 each comprise three inverters 240. The tracks 230 and 231 are connected to each other in parallel and within a track, the inverters are connected to each other in parallel. Thus, the two tracks 230 and 231 are independent of each other because they receive their power independently of each other. This makes it possible to have redundant tracks, and not to have fault propagation when one of the tracks is faulty. The reliability and availability of the power chain is thus improved.

The power and control electronics device 220 can for example be directly connected to the motor by bar bus connections 222. It can also be connected for example to a direct voltage source by bar bus connections 224.

The device 220 can also comprise an oil inlet and outlet 223.

Figure 3:
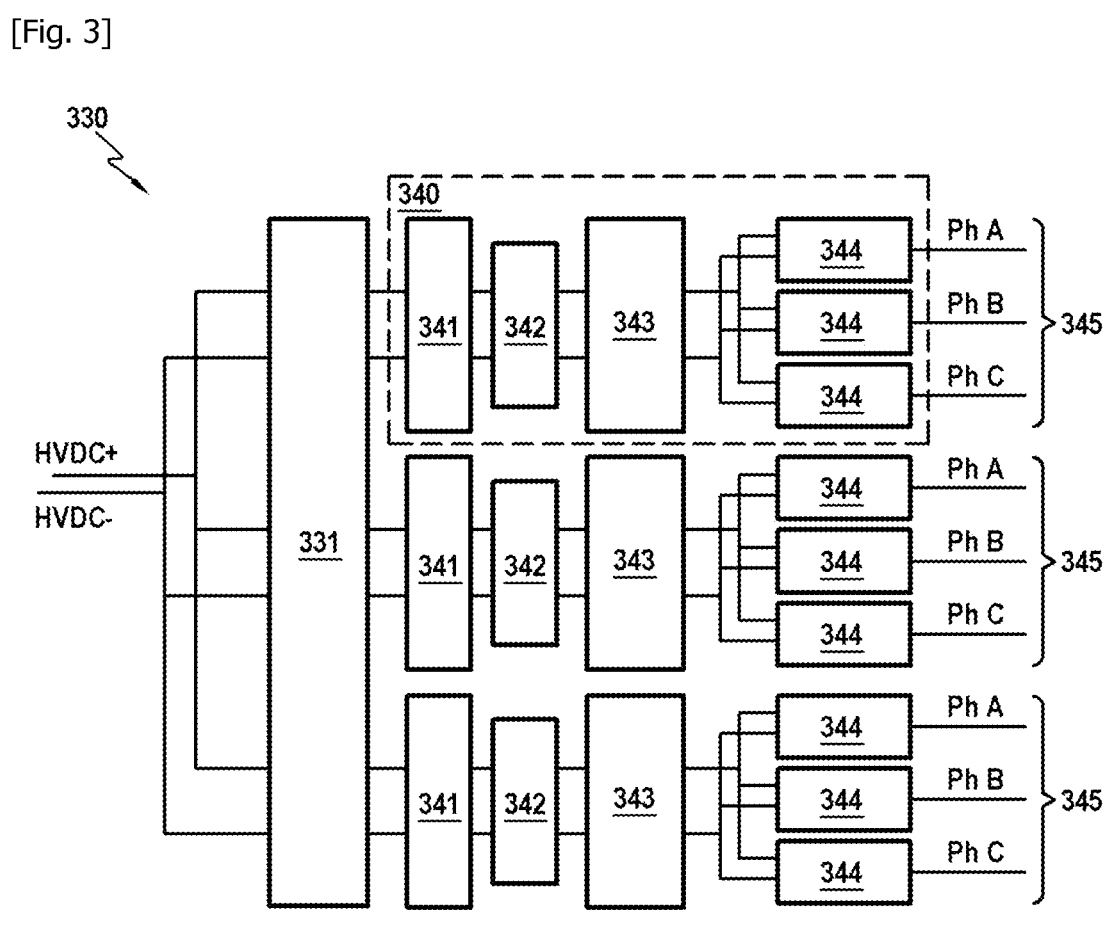

FIG. 3 schematically and partially represents an electrical track 330 of a control and power device according to one embodiment of the invention.

The track 330 comprises three inverters 340 connected to each other in parallel and an interconnection board 331 making it possible to interface between the inverters 340 and the external environment, for example the motor.

The track 330 also comprises, for each inverter 340, a filter element 341, a direct voltage measurement board 342 and a power module monitoring board 343 ("PCM" board). The track 330 also comprises three power modules 344 per inverter 340. A driver board per power module 344 can also be present.

The different elements of the track 330 are for example placed next to each other to form the ring.

A track 330 also comprises three outputs 345, one for each inverter 340. In this embodiment, the outputs 345 are three-phase outputs.

The DC voltage measurement board 342 can also be configured to measure a temperature of the associated inverter.

The filter element 341 can be rounded in shape so as to adapt to the circular shape of the power and control electronics device of the invention. This filter element comprises capacitances for storing energy and filter coils.

The power electronics device can have a power comprised between 400 kW and 1 MW, in which each electronic track can have a power comprised between 200 kW and 500 kW and each inverter can have a power greater than or equal to 70 kW.

Thanks to the invention, it is for example possible to have an electric propulsion system delivering a power of 500 kW and comprising a power and control electronics device of 540 kW comprising two electrical tracks of 270 kW each and three inverters of 90 kW per electrical track.

In the embodiments described above, the electrical tracks form concentric rings.

In addition, as required, the power and control electronics device can comprise more than two electrical tracks, where each track has the shape of a ring. The rings thus formed are concentric.

Likewise, as required, the electrical tracks can comprise two inverters. They can more generally comprise at least two inverters in each electrical track.

The electric propulsion system according to the invention can for example be a conventional aircraft propulsion system (CTOL) or a vertical takeoff and landing aircraft propulsion system (VTOL) or a short takeoff and landing aircraft propulsion system (STOL).

The invention also relates to an aircraft comprising an electric propulsion system according to the invention.

The invention claimed is:

1. An aircraft electric propulsion system comprising:

a motor comprising a hollow rotor, and a power and control electronics device, wherein the power and control electronics device comprises at least two ring-shaped electrical tracks each comprising at least two inverters, the inverters being connected to each other in parallel, wherein the electrical tracks delimit a hollow circular part of the power and control electronics device, the hollow circular part being placed in an axis of the hollow rotor of the motor, and wherein the at least two rings formed by the electrical tracks of the power and control electronics device are concentric, one of the rings forming an inner surface of the hollow circular part and another of the rings forming an outer surface of the hollow circular part.

2. The electric propulsion system according to claim 1, wherein the power and control electronics device has a power comprised between 400 kW and 1 MW, wherein each electrical track has a power comprised between 200 kW and 500 kW and each inverter has a power greater than or equal to 70 kW.

3. The electric propulsion system according to claim 1, wherein the motor is a permanent magnet motor.

4. The electric propulsion system according to claim 1, comprising a propeller pitch actuator placed at least partly in the hollow circular part of the power and control electronics device and in the axis of the hollow rotor of the motor.

5. The electric propulsion system according to claim 1, comprising a fluid cooling circuit configured to cool the motor and the power and control electronics device.

6. The electric propulsion system according to claim 1, wherein the system is a vertical takeoff and landing aircraft propulsion system.

7. The electric propulsion system according to claim 1, wherein the system is a short takeoff and landing aircraft propulsion system.

8. The electric propulsion system according to claim 1, wherein the system is a conventional aircraft propulsion system.

9. An aircraft with electric or hybrid electric/thermal propulsion comprising an electric propulsion system according to claim 1.

* * * * *